United States Patent
Yoshitomi et al.

(10) Patent No.: US 7,589,485 B2
(45) Date of Patent: Sep. 15, 2009

(54) MOTOR CONTROL CIRCUIT, FAN MOTOR, ELECTRONIC DEVICE, AND NOTEBOOK PERSONAL COMPUTER

(75) Inventors: Tetsuya Yoshitomi, Ora-machi (JP); Joji Noie, Ota-shi (JP); Toshiyuki Imai, Okumi-machi (JP)

(73) Assignees: Sanyo Electric Co., Ltd., Osaka (JP); Sanyo Semiconductor Co., Ltd., Gunma (JP)

(*) Notice: Subject to any disclaimer, the term of this patent is extended or adjusted under 35 U.S.C. 154(b) by 0 days.

(21) Appl. No.: 12/254,731

(22) Filed: Oct. 20, 2008

(65) Prior Publication Data

US 2009/0102406 A1    Apr. 23, 2009

Related U.S. Application Data

(63) Continuation of application No. PCT/JP2007/075104, filed on Dec. 27, 2007.

(30) Foreign Application Priority Data

Apr. 5, 2007    (JP)    ............................. 2007-099721

(51) Int. Cl.
*H02K 29/12*    (2006.01)
(52) U.S. Cl. ........................... 318/400.37; 318/400.38
(58) Field of Classification Search .......... 318/400.01, 318/400.37, 400.38, 432, 727, 811
See application file for complete search history.

(56) References Cited

U.S. PATENT DOCUMENTS

| | | | | |
|---|---|---|---|---|
| 6,150,779 | A  * | 11/2000 | Itami et al. | 318/400.11 |
| 6,836,085 | B2 * | 12/2004 | Kawada et al. | 318/139 |
| 6,900,613 | B2 * | 5/2005 | Hirono | 318/722 |
| 7,112,936 | B2 * | 9/2006 | Lee | 318/400.01 |

FOREIGN PATENT DOCUMENTS

JP    2001-086783    3/2001

* cited by examiner

*Primary Examiner*—Rina I Duda
(74) *Attorney, Agent, or Firm*—SoCal IP Law Group LLP; Steven C. Sereboff; John E. Gunther (57) ABSTRACT

A motor control circuit comprising: a rotation control circuit configured to control rotation of a motor based on a rotation control signal for controlling rotation of the motor and a rotational position detection signal from a Hall element for detecting a rotational position of the motor; a determining circuit configured to determine whether the rotation control signal has been generated for a predetermined time period; and a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

8 Claims, 7 Drawing Sheets

MOTOR CONTROL CIRCUIT, FAN MOTOR, ELECTRONIC DEVICE, AND NOTEBOOK PERSONAL COMPUTER

CROSS-REFERENCE TO RELATED APPLICATIONS

This is a continuation application of International Patent Application No. PCT/JP2007/075104 filed Dec. 27, 2007, which claims the benefit of priority to Japanese Patent Application No. 2007-099721 filed Apr. 5, 2007. The full contents of the International Patent Application are incorporated herein by reference.

BACKGROUND OF THE INVENTION

1. Field of the Invention

The present invention relates to a motor control circuit, a fan motor, electronic device, and a notebook personal computer.

2. Description of the Related Art

In a case where electronic device has a heating body that generates heat when operating the electronic device, the electronic device is usually provided with a fan motor for cooling the heating body. For example, in a case of a PC, server, etc., the operating frequency of a CPU has been getting higher year after year, which causes an increase in amount of heat generated from the CPU. For this reason, a PC (Personal Computer), server, etc., includes a fan motor for cooling a device to be cooled such as the CPU, a Hall element outputting a rotational position detection signal indicating a result of detection of a rotational position of the fan motor, and a motor control circuit rotating the fan motor in a predetermined direction based on a predetermined rotation control signal (see, e.g., Japanese Patent Application Laid-Open Publication Nos. 2003-204692, 2005-224100, and 2006-174648).

The Hall element is applied with a source voltage from a power supply dedicated to the Hall element or a power supply included in the motor control circuit, to operate, regardless of whether the rotation control signal for controlling the rotation of the motor is generated or not. That is, power consumption by the Hall element occurs even in a motor stop period during which the motor is not rotated by the motor control circuit, which causes lower efficiency in use of the Hall element source voltage, and may result in greater power consumption by the whole system.

SUMMARY OF THE INVENTION

A motor control circuit, according to an aspect of the present invention, comprises: a rotation control circuit configured to control rotation of a motor based on a rotation control signal for controlling rotation of the motor and a rotational position detection signal from a Hall element for detecting a rotational position of the motor; a determining circuit configured to determine whether the rotation control signal has been generated for a predetermined time period; and a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

First Embodiment

Figure 1:
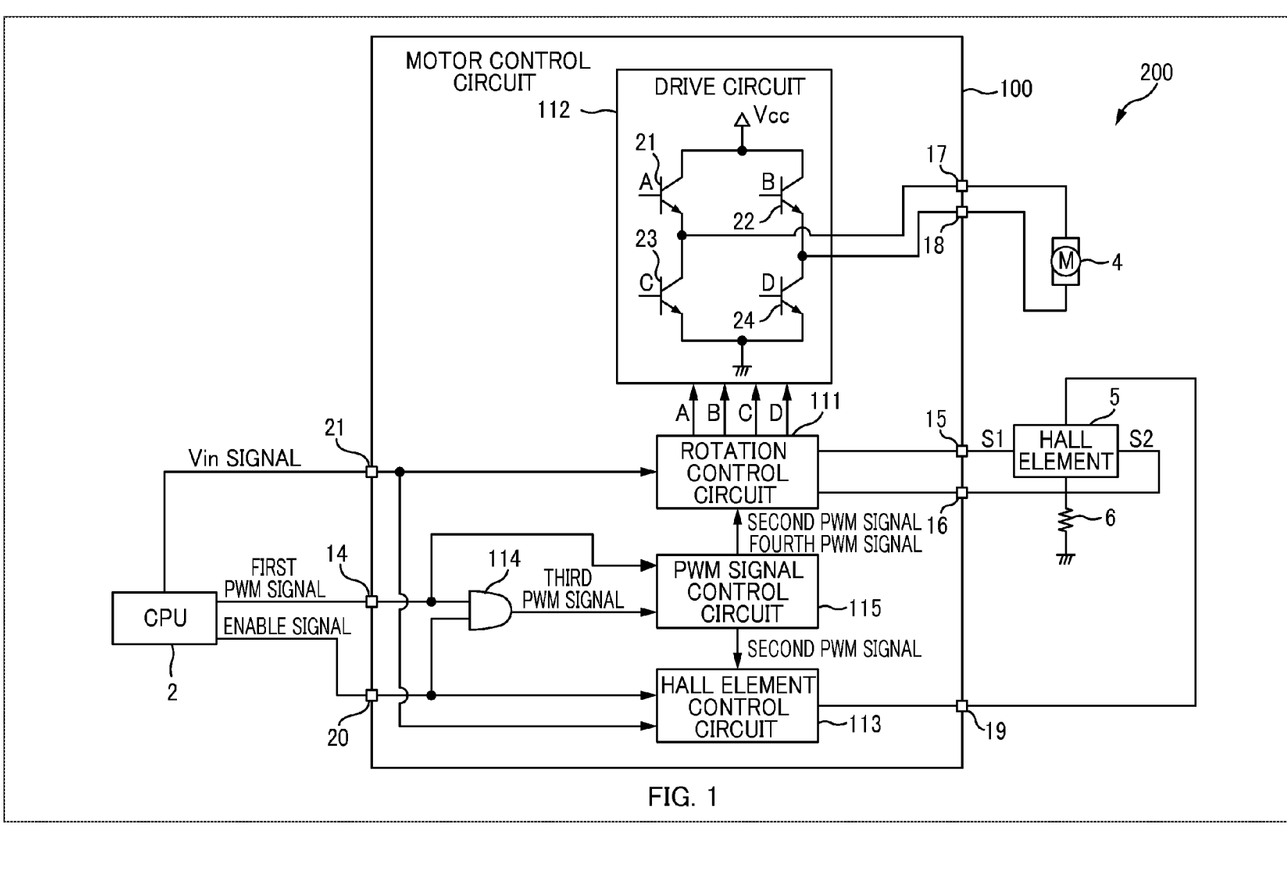
FIG. 1 depicts a configuration example of a motor control device according to one embodiment of the present invention.
Figure 2:
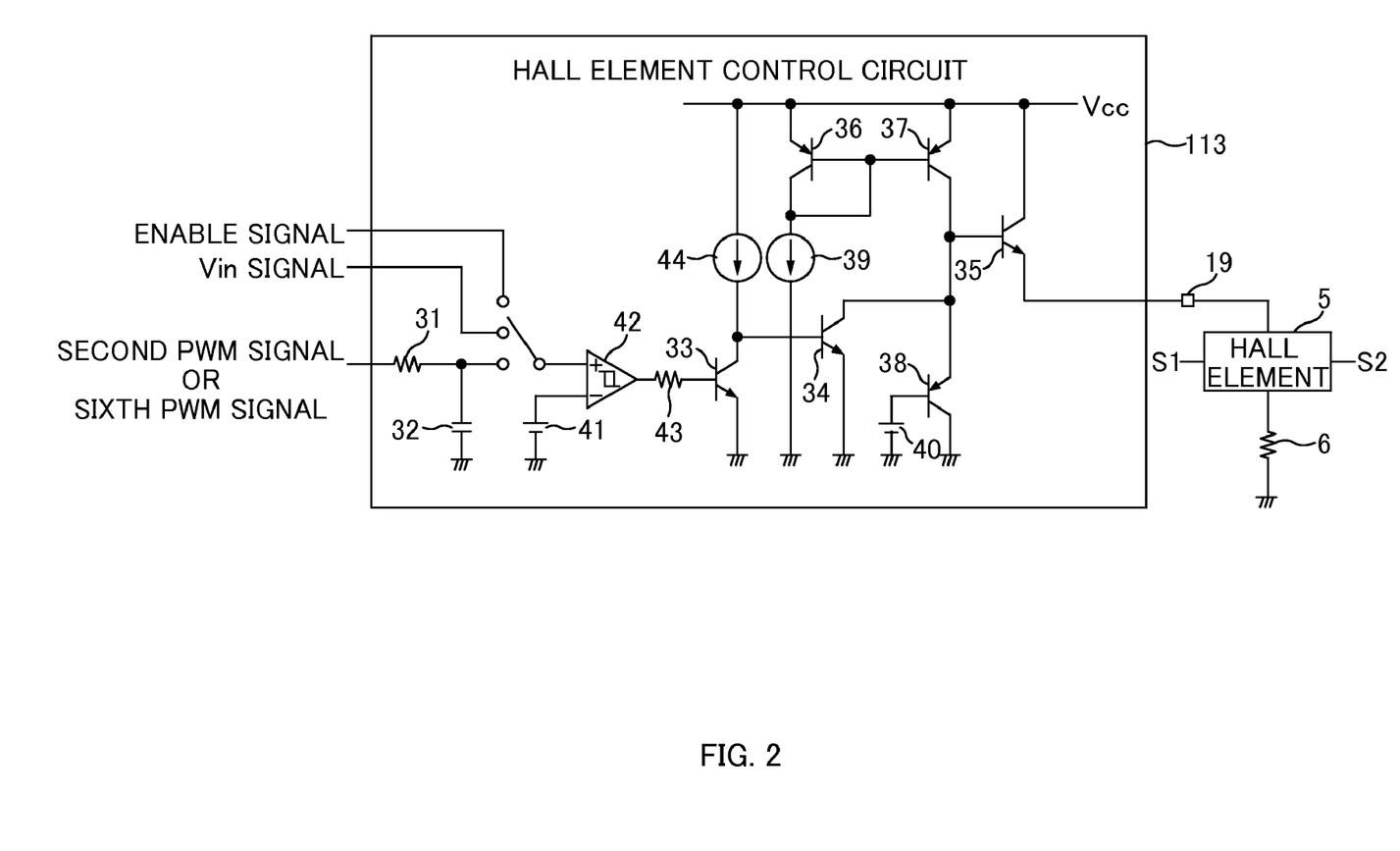
FIG. 2 depicts a configuration example of a Hall element control circuit according to one embodiment of the present invention.
Figure 3:
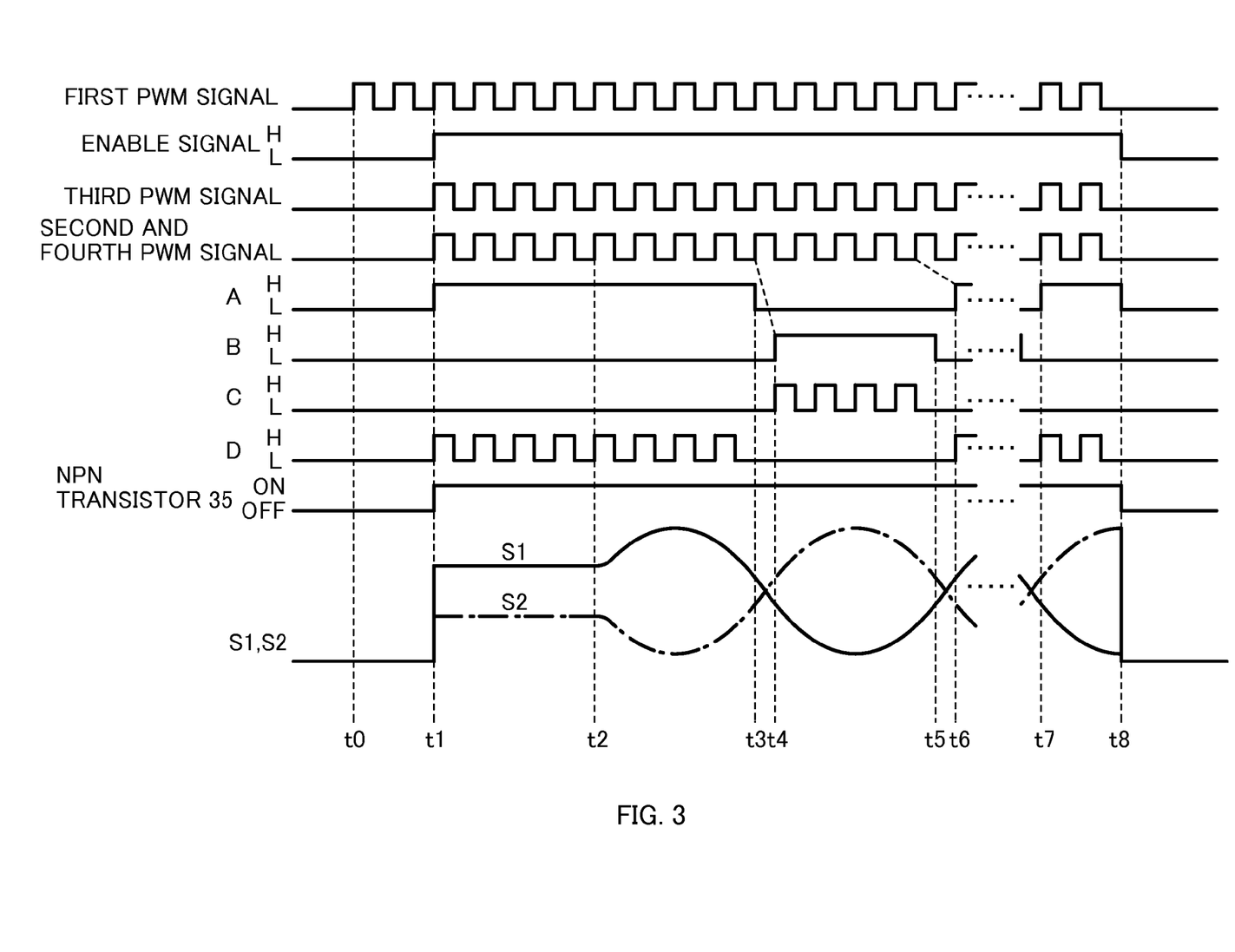
FIG. 3 is a waveform diagram of main signals of a motor control device according to one embodiment of the present invention.

A first embodiment will be described with reference to FIGS. 1 to 3. In all embodiments, it is assumed that a motor 4 is used to rotate a fan for cooling a CPU incorporated in a PC, server, etc. It is also assumed that the motor 4 is provided as, for example, a single-phase motor including a single-phase driving coil (not shown) and a Hall element 5, or a three-phase motor including a three-phase star connected driving coil and the hall element 5. The Hall element 5 is fixed to the stator (not shown) of the motor 4 at each predetermined angle, and outputs sine-wave-shaped rotational position detection signals S1 and S2 which are reverse in phase with each other when the rotor (not shown) of the motor 4 rotates. The frequencies of the rotational position detection signals S1 and S2 are proportional to the number of rotation of the motor 4. In an embodiment, npn transistors are used for all of source transistors 21 and 22 and sink transistors 23 and 24 making up a drive circuit 112, however, pnp transistors or MOSFETs may be used.

There will be described operation of a motor control device 200 when rotating the motor 4.

A CPU 2 generates a first PWM signal with a duty ratio set for controlling the rotation of the motor 4 to be output to a motor control circuit 100. When the number of rotation of the motor 4 is increased, the first PWM signal is set such that on-duty (the ratio of a period during which the signal is high to a predetermined period) is to be high. When the number of rotation of the motor 4 is decreased or the rotation of the motor 4 is stopped (hereinafter, such a case is referred to as "standby mode" of the motor 4), the first PWM signal is set such that on-duty is to be low. The first PWM signal is input to a PWM signal control circuit 115 via a PWM input terminal 14. The PWM signal control circuit 115 generates a second PWM signal obtained by performing a waveform shaping process for the first PWM signal, to be output to a Hall element control circuit 113 and to a rotation control circuit 111 (between t0 and t8).

In the Hall element control circuit 113, a capacitor 32 is charged in response to the second PWM signal of a high level via a resistor 31. A Schmidt comparator 42 outputs a signal of a high level when the charging voltage of the capacitor 32 is greater than the voltage of a power supply 41. As a result, an npn transistor 33 is turned on, an npn transistor 34 is turned off, and an npn transistor 35 is turned on. Thus, a Hall element source voltage ((source voltage Vcc)−(collector-emitter voltage of npn transistor 35)) is applied to a power input of the Hall element 5 via a Hall element source voltage supply terminal 19. As a result of this, the Hall element 5 becomes in an operable state, and generates the rotational position detection signals S1 and S2 indicating the detection of rotational position of the rotor of the motor 4 relative to the Hall element 5 (between t1 and t8). The rotational position detection signals S1 and S2 are input to the rotation control circuit 111 via an S1 input terminal 15 and an S2 input terminal 16.

Based on the second PWM signal and the rotational position detection signals S1 and S2, the rotation control circuit 111 generates base voltages A to D for complementarily turning on and off a pair of the source transistor 21 and the sink transistor 24 and a pair of the source transistor 22 and the sink transistor 23. The second PWM signal is superposed on the base voltages C and D. As a result, the source transistors 21 and 22 perform saturation drive and the sink transistors 23 and 24 perform PWM drive. The direction of a current flowing through the driving coil of the motor 4 changes in timing of phase changeover, so that the motor 4 is rotated in a predetermined direction in the number of rotations corresponding to the second PWM signal (between t2 and t8).

There will then be described operation of the motor control device 200 when putting the motor 4 into the standby mode.

To put the motor 4 into the standby mode, the CPU 2 generates the first PWM signal of a low level to be output to the motor control circuit 100. The first PWM signal of a low level is input to the PWM signal control circuit 115 via the PWM output terminal 14. The PWM signal control circuit 115 generates the second PWM signal of a low level obtained by performing the waveform shaping process for the first PWM signal of a low level, to be output to the rotation control circuit 111 and to the Hall element control circuit 113 (from t8 onward).

The capacitor 32 is discharged in response to the second PWM signal of a low level via the resistor 31. The Schmidt comparator 42 outputs a signal of a low level when the charging voltage of the capacitor 32 is smaller than the voltage of the power supply 41. As a result, the npn transistor 33 is turned off, the npn transistor 34 is turned on, and the npn transistor 35 is turned off. Thus, the application is stopped of the Hall element source voltage to the power input of the Hall element 5 via the Hall element source voltage supply terminal 19. As a result, the Hall element 5 stops performing a detection operation, thereby ceasing to output the rotational position detection signals S1 and S2.

Based on the second PWM signal of a low level, the rotation control circuit 111 outputs the base voltages A to D of low levels to the base electrodes of the source transistors 21 and 22 and sink transistors 23 and 24, respectively. Therefore, the source transistors 21 and 22 and sink transistors 23 and 24 are turned off, thereby ceasing to supply current to the motor 4. As a result, the motor 4 becomes in the standby mode.

Second Embodiment

A second embodiment will be described with reference to FIGS. 1 to 4. In the second embodiment, the motor control device 200 applies and stops applying the Hall element source voltage to the power input of the Hall element 5, using a DC signal (rotation control signal, hereinafter referred to as "Vin signal") output from the CPU 2, having a level corresponding to a state of rotation or standby of the motor 4, and the rotational position detection signals S1 and S2 output from the Hall element 5.

There will be described operation of the motor control device 200 when rotating the motor 4.

To rotate the motor 4, the CPU 2 generates a Vin signal having a voltage greater than the voltage of the power supply 41, to be output to the motor control circuit 100. The Vin signal is input to the Hall element control circuit 113 and to the rotation control circuit 111 via a Vin terminal 21.

In the Hall element control circuit 113, when the voltage of the Vin signal from the CPU 2 is greater than the voltage of the power supply 41, the Schmidt comparator 42 outputs a signal of a high level to the base electrode of the npn transistor 33 via a resistor 43. As a result, the npn transistor 33 is turned on, the npn transistor 34 is turned off, and the npn transistor 35 is turned on.

Since a pnp transistor 38 and the npn transistor 35 are connected in emitter follower configuration, a voltage depending on the voltage of a power supply 40 ((voltage of power supply 40)+(base-emitter voltage of pnp transistor 38)−(base-emitter voltage of npn transistor 35)) is output from the Hall element source voltage supply terminal 19 as the Hall element source voltage, and is applied to the power input of the Hall element 5. As a result of this, the Hall element 5 becomes in an operable state, and generates and outputs the rotational position detection signals S1 and S2 indicating the detection of rotational position of the rotor of the motor 4 relative to the Hall element 5. The rotational position detection signals S1 and S2 are input to the rotation control circuit 111 via the S1 input terminal 15 and S2 input terminal 16.

Figure 4:
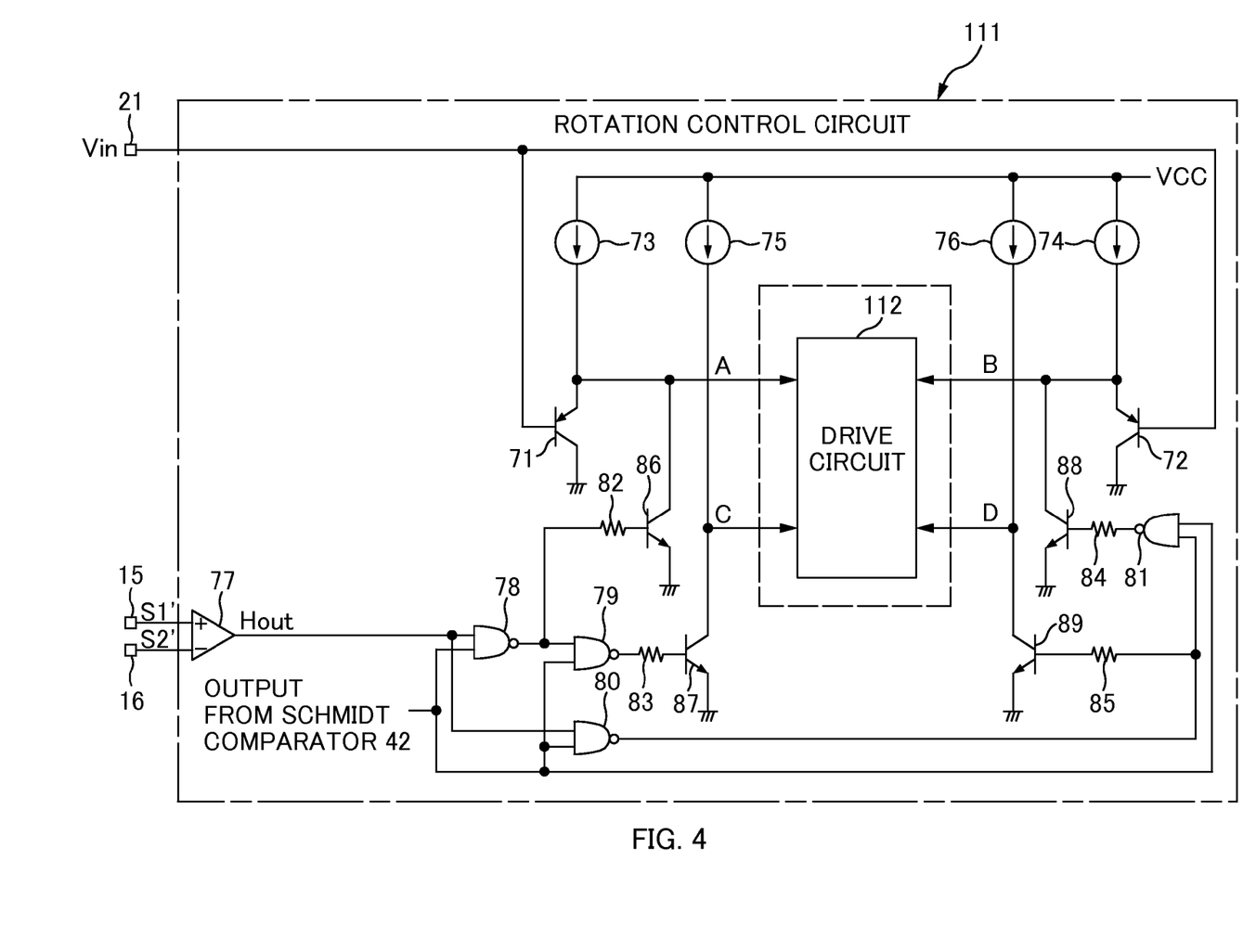
FIG. 4 depicts a configuration example of a rotation control circuit according to one embodiment of the present invention.

In the rotation control circuit 111, the Vin signal (greater than the voltage of the power supply 41) is applied to the base electrodes of pnp transistors 71 and 72. Therefore, output voltages of coil connection terminals 17 and 18 when the source transistors 21 and 22 are complementarily turned on and off are voltages determined in an analog manner corresponding to a change in voltage of the Vin signal. Specifically, the Vin signal from the CPU 2 is applied to the base electrodes of the transistors 71 and 72. For this reason, a voltage depending on the Vin voltage ((Vin voltage)+(base-emitter voltage of pnp transistor 71) is output to the emitters of the transistors 71 and 72. The source transistors 21 and 22 are also connected in emitter follower configuration, and therefore, a voltage depending on the Vin voltage ((Vin voltage)+(base-emitter voltages of pnp transistors 71 and 72)−(base-emitter voltages of source transistors 21 and 22)) is output to the emitters of the source transistors 21 and 22. That is, when the Vin voltage is greater than the voltage of the power supply 41, output voltages of the coil connection terminals 17 and 18 when the source transistors 21 and 22 are turned on are controlled in an analog manner according to the Vin voltage.

The rotation control circuit 111 operates in the following manner when the rotational position detection signal S1 is greater than the rotational position detection signal S2, for example.

A comparator 77 outputs a square-wave signal Hout of a high level. A NAND circuit 78 is input with the square-wave signal Hout of a high level, to output a signal of a low level to an npn transistor 86 via a resistor 82 and to a NAND circuit 79. Therefore, the npn transistor 86 is turned off, and the base voltage A determined according to the voltage of the Vin signal is applied to the base electrode of the source transistor 21. The NAND circuit 79 outputs a signal of a high level obtained by reversing a signal of a low level from the NAND circuit 78 to the base electrode of an npn transistor 87 via a resistor 83. Therefore, the npn transistor 87 is turned on, and the base voltage C for turning off the sink transistor 23 is applied to the base electrode of the sink transistor 23.

A NAND circuit 80 is input with the square-wave signal Hout of a high level, to output a signal of a low level to an npn transistor 89 via a resistor 85 and to a NAND circuit 81. Therefore, the npn transistor 89 is turned off, and the base voltage D for turning on the sink transistor 24 is applied to the base electrode of the sink transistor 24. The NAND circuit 81 outputs a signal of a high level obtained by reversing a signal of low level from the NAND circuit 80 to an npn transistor 88 via a resistor 84. Therefore, the npn transistor 88 is turned on, and the base voltage B for turning off the source transistor 22 is applied to the base electrode of the source transistor 22, independent of the Vin signal.

As described above, when the rotational position detection signal S1 is greater than the rotational position detection signal S2, the pair of the source transistor 21 and the sink transistor 24 is turned on, and the pair of the source transistor 22 and the sink transistor 23 is turned off. Contrary to that, when the rotational position detection signal S1 is smaller than the rotational position detection signal S2, the process is in reverse to the above process, and therefore, the pair of the source transistor 21 and the sink transistor 24 is turned off, and the pair of the source transistor 22 and the sink transistor 23 is turned on.

In this manner, the rotation control circuit 111 outputs the base voltages A to D for complementarily turning on and off the pair of the source transistor 21 and the sink transistor 24 and the pair of the source transistor 22 and the sink transistor 23, based on the Vin signal and the rotational position detection signals S1 and S2. As a result, the direction of a current flowing through the motor 4 is changed in timing of the change in magnitude relation between the rotational position detection signals S1 and S2, to rotate the motor 4 in a predetermined direction.

There will then be described operation of the motor control device 200 when putting the motor 4 in the standby mode.

To put the motor 4 into the standby mode, the CPU 2 generates the Vin signal having a voltage smaller than the voltage of the power supply 41, to be output to the motor control circuit 100. The Vin signal is input to the Hall element control circuit 113 and to the rotation control circuit 111 via the Vin terminal 21.

In the Hall element control circuit 113, since the voltage of the Vin signal is smaller than the voltage of the power supply 41, the Schmidt comparator 42 outputs a signal of a low level. As a result, the npn transistor 33 is turned off, the npn transistor 34 is turned on, and the npn transistor 35 is turned off, and thus application is stopped of the Hall element source voltage to the power input of the Hall element 5 via the Hall element source voltage supply terminal 19. As a result, the Hall element 5 stops performing the detection operation, thereby ceasing to output the rotational position detection signals S1 and S2 to the rotation control circuit 111.

Since the Schmidt comparator 42 outputs a signal of a low level, each of the NAND circuits 78 to 81 outputs a signal of a high level regardless of the square-wave signal Hout from the comparator 77. Therefore, all of the npn transistors 86 to 89 are turned on, and all of the source transistors 21 and 22 and sink transistors 23 and 24 are turned off. As a result, current supply to the motor 4 is stopped regardless of the presence/absence of the rotational position detection signals S1 and S2, and thus, the motor 4 becomes in the standby mode.

Although the Vin signal is applied to the base electrodes of the pnp transistors 71 and 72 in the rotation control circuit 111, since the npn transistors 86 and 88 are turned on, the source transistors 21 and 22 are turned off regardless of an operation state of the pnp transistors 71 and 72.

Third Embodiment

A third embodiment will be described with reference to FIGS. 1 to 3. In the third embodiment, the CPU 2 outputs the first PWM signal and an ENABLE signal (rotation control signal) of a high level to the motor control circuit 100 when rotating the motor 4. The ENABLE signal of a high level causes an AND circuit 114 to output a third PWM signal identical in waveform with the first PWM signal, and has a voltage higher than a voltage generated by the power supply 41. The CPU 2 outputs the first PWM signal of a low level and the ENABLE signal of a low level when the motor 4 is put into the standby mode. The ENABLE signal of a low level causes the AND circuit 114 to output the third PWM signal of a low level, and has a voltage lower than a voltage generated by the power supply 41. In the third embodiment, there is carried out or stopped application of the Hall element source voltage to the power input of the Hall element 5 using the above ENABLE signal.

There will hereinafter be described operation of the motor control device 200 when rotating the motor 4.

The CPU 2 generates the first PWM signal for controlling the rotation of the motor 4 using duty ratio and the ENABLE signal of a high level, to be output to the motor control circuit 100. The first PWM signal is input to one input of the AND circuit 114 via the PWM input terminal 14. The ENABLE signal of a high level is input to the other input terminal of the AND circuit 114 and to the Hall element control circuit 113 via a second input terminal 20.

The AND circuit 114 outputs the third PWM signal of a high level in a case where both the first PWM signal and ENABLE signal are high, and outputs the third PWM signal of a low level in a case other than the above case.

Therefore, in this case, the AND circuit 114 outputs the third PWM signal identical in waveform with the first PWM signal to the PWM signal control circuit 115 in response to the first PWM signal and the ENABLE signal of a high level. The PWM signal control circuit 115 generates a fourth PWM signal obtained by performing the waveform shaping process for the third PWM signal, to be output to the rotation control circuit 111 (between t1 and t8).

In the Hall element control circuit 113, the Schmidt comparator 42 outputs a signal of a high level in response to the ENABLE signal of a high level input to the positive input terminal of the comparator 42. As a result, the npn transistor 33 is turned on, the npn transistor 34 is turned off, and the npn transistor 35 is turned on. Thus, there is applied the Hall element source voltage ((source voltage Vcc)−(corrector-emitter voltage of npn transistor 35)) to the power input terminal of the Hall element 5 via the Hall element source voltage supply terminal 19.

As a result of this, the Hall element 5 becomes in an operable state, and generates and outputs the rotational position detection signals S1 and S2 indicating the detection of the rotational position of the rotor of the motor 4 relative to the Hall element 5. The rotational position detection signals S1 and S2 are input to the rotation control circuit 111 via the S1 input terminal 15 and S2 input terminal 16. Thus, the rotation control circuit 111 rotates the motor 4 in a predetermined direction in the number of rotation corresponding to the fourth PWM signal, based on the fourth PWM signal and the rotational position detection signals S1 and S2.

There will then be described operation of the motor control device 200 when putting the motor 4 into the standby mode.

To put the motor 4 into the standby mode, the CPU 2 generates the first PWM signal of a low level and the ENABLE signal of a low level, to be output to the motor control circuit 100. The first PWM signal of a low level is input to one input terminal of the AND circuit 114 via the PWM output terminal 14, and the ENABLE signal of a low level is input to the other input of the AND circuit 114 and to the Hall element control circuit 113 via the second input terminal 20.

The AND circuit 114 outputs the third PWM signal of a low level in response to the PWM signal of a low level and the ENABLE signal of a low level. The PWM signal control circuit 115 generates the fourth PWM signal of a low level obtained by performing the waveform shaping process for the third PWM signal of a low level, to be output to the rotation control circuit 111 (at t8).

In the Hall element control circuit 113, the Schmidt comparator 42 outputs a signal of a low level in response to the ENABLE signal of a low level input to the positive input terminal of the comparator 42. Therefore, the npn transistor 33 is turned off, the npn transistor 34 is turned on, and the npn transistor 35 is turned off. Thus, the application is stopped of the Hall element source voltage to the power input terminal of the Hall element 5 via the Hall element source voltage supply terminal 19. As a result, the Hall element 5 stops performing the detection operation, thereby ceasing to output the rotational position detection signals S1 and S2.

The rotation control circuit 111 outputs the base voltages A to D of low levels to the base electrodes of the source transistors 21 and 22 and the sink transistors 23 and 24, respectively, based on the fourth PWM signal of a low level. Therefore, the source transistors 21 and 22 and the sink transistors 23 and 24 are turned off so that current supply to the motor 4 is stopped, and thus, the motor 4 is stopped.

Fourth Embodiment

Figure 5:
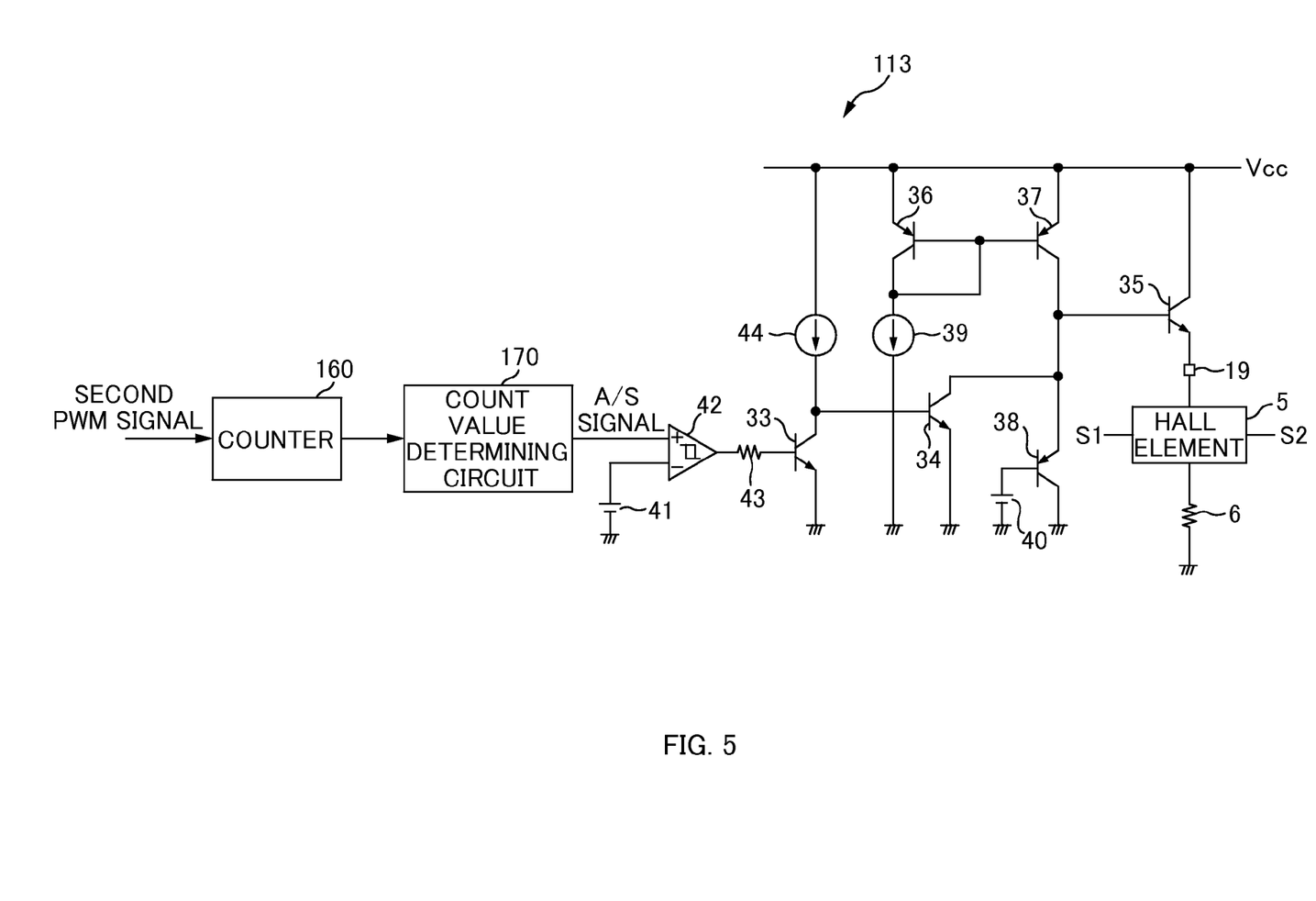
FIG. 5 depicts a configuration example of another Hall element control circuit according to one embodiment of the present invention.

A fourth embodiment will be described with reference to FIGS. 1 and 5.

There will first be described operation of the motor control device 200 for rotating the motor 4.

The CPU 2 generates the first PWM signal with a duty ratio set for controlling the rotation of the motor 4, to be output to the motor control circuit 100. The first PWM signal is input to the PWM signal control circuit 115 via the PWM input terminal 14. The PWM signal control circuit 115 generates the second PWM signal obtained by performing the waveform shaping process for the first PWM signal, to be output to the rotation control circuit 111 and to the Hall element control circuit 113.

In the Hall element control circuit 113, when the second PWM signal is input to the Hall element control circuit 113, a counter 160 counts edges thereof. A count value determining circuit 170 determines whether the number of edges of the second PWM signal obtained by counting at the counter 160 reaches a predetermined number within a predetermined period of time timed by a timer, etc. The count value determining circuit 170 outputs an A/S signal of a high level when the number of the edges thereof reaches the predetermined number, and outputs an A/S signal of a low level when the number of the edges thereof does not reach the predetermined number. In this case, the number of the edges thereof reaches the predetermined number, and therefore, the count value determining circuit 170 outputs the A/S signal of a high level to the positive input terminal of the Schmidt comparator 42.

Since the A/S signal input to the positive input terminal of the Schmidt comparator 42, the Schmidt comparator 42 outputs a signal of a high level to the base electrode of the npn transistor 33 via a resistor 43. Therefore, the npn transistor 33 is turned on, the npn transistor 34 is turned off, and the npn transistor 35 is turned on. Thus, the Hall element source voltage ((source voltage Vcc)−(corrector-emitter voltage of npn transistor 35)) is applied to the power input of the Hall element 5 via the Hall element source voltage supply terminal 19.

As a result, the Hall element 5 becomes capable of performing the detection operation, and generates and outputs the rotational position detection signals S1 and S2 indicating the detection of rotational position of the rotor of the motor 4 relative to the Hall element 5. The rotational position detection signals S1 and S2 are input to the rotation control circuit 111 via the S1 input terminal 15 and S2 input terminal 16. Thus, the rotation control circuit 111 rotates the motor 4 in a predetermined direction in the number of rotation corresponding to the second PWM signal, based on the second PWM signal and the rotational position detection signals S1 and S2.

There will then be described operation of the motor control device 200 when putting the motor 4 into the standby mode.

To put the motor 4 into the standby mode, the CPU 2 generates the first PWM signal of a low level, to be output to the motor control circuit 100. The first PWM signal of a low level is input to the PWM signal control circuit 115 via the PWM output terminal 14. The PWM signal control circuit 115 generates the second PWM signal of a low level obtained by performing the waveform reshaping process for the first PWM signal of a low level, to be output to the Hall element control circuit 113 and to the rotation control circuit 111.

In the Hall element control circuit 113, the Schmidt comparator 42 outputs a signal of a low level in response to the A/S signal of a low level input to the positive input terminal of the comparator 42. Therefore, the npn transistor 33 is turned off, the npn transistor 34 is turned on, and the npn transistor 35 is turned off. Thus, the application is stopped of the Hall element source voltage to the Hall element 5 via the Hall element source voltage supply terminal 19. As a result, the Hall element 5 stops performing the detection operation, thereby ceasing to output the rotational position detection signals S1 and S2 to the rotation control circuit 111.

The rotation control circuit 111 outputs the base voltages A to D of low levels to the base electrodes of the source transistors 21 and 22 and the sink transistors 23 and 24, respectively, based on the second PWM signal of a low level. Therefore, the source transistors 21 and 22 and the sink transistors 23 and 24 are turned off, so that the motor 4 becomes in the standby mode.

Fifth Embodiment

Figure 6:
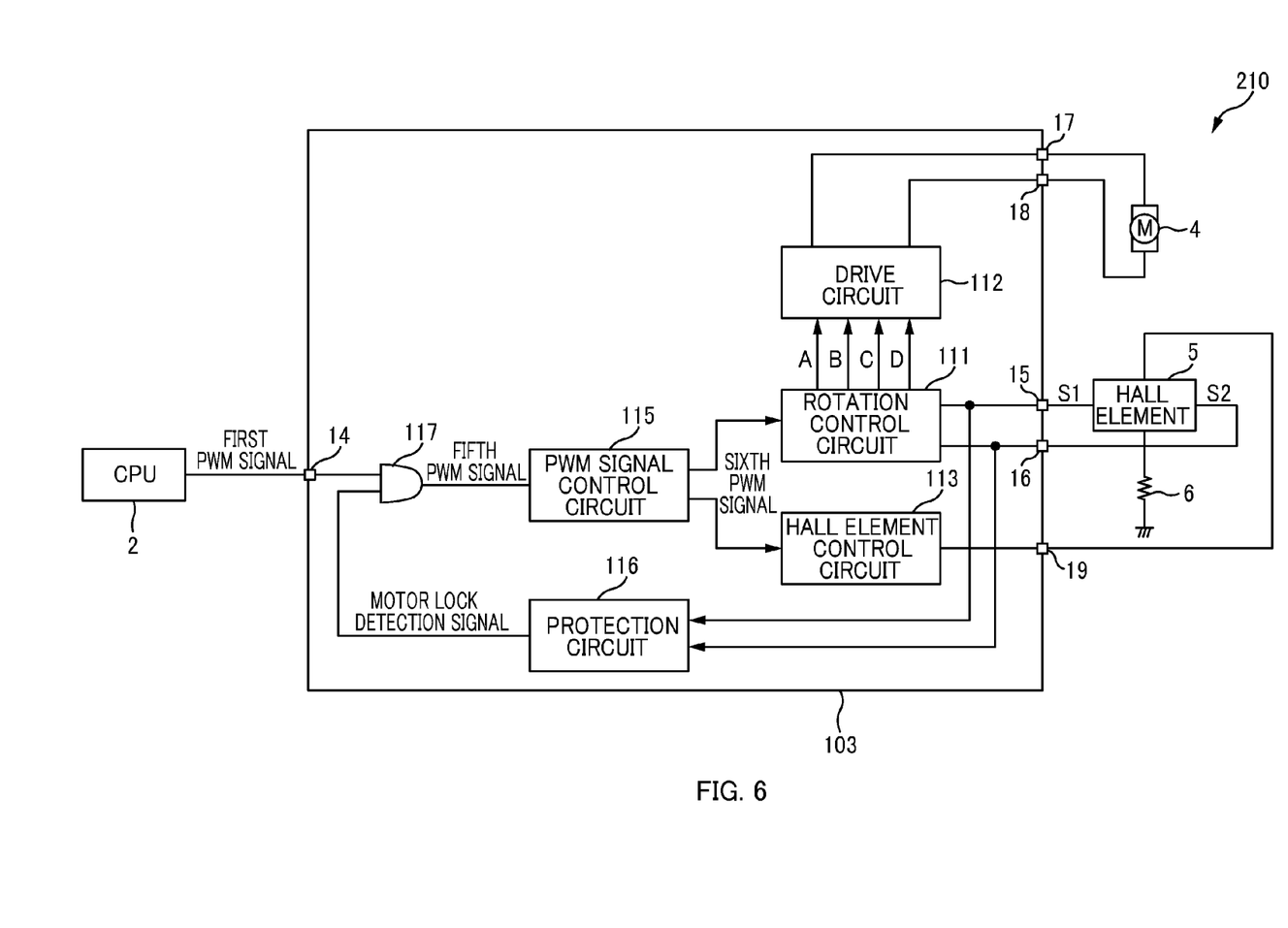
FIG. 6 depicts a configuration example of another motor control device according to one embodiment of the present invention.
Figure 7:
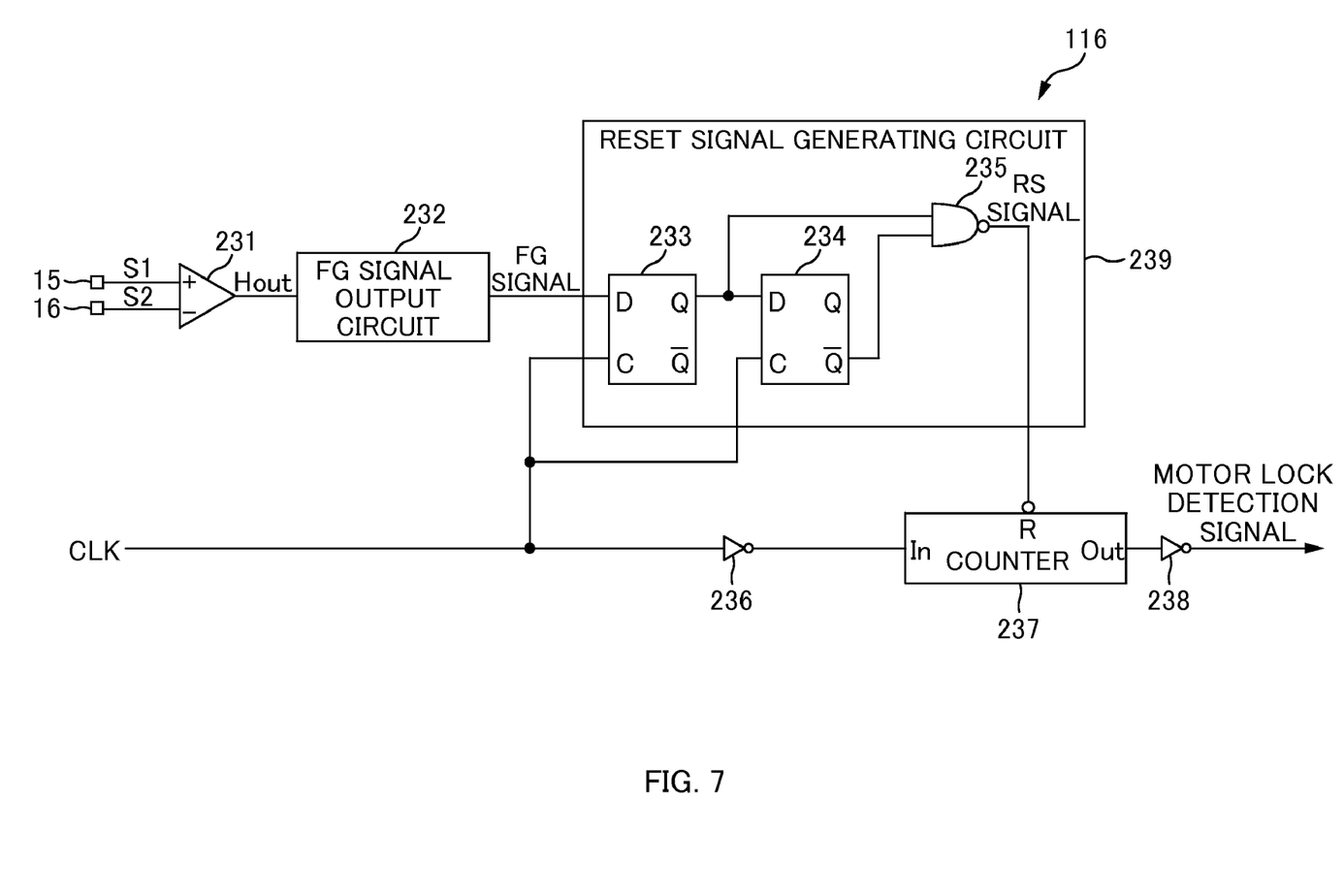
FIG. 7 depicts a configuration example of a protection circuit according to one embodiment of the present invention.

A fifth embodiment will be described with reference to FIGS. 6 to 7. In the fifth embodiment, there is provided a protection circuit 116, which protects the constituents of a motor control circuit 103 from damage, such as heat generation, in the case where rotating of the motor 4 is stopped (locked) though the drive circuit 112 supplies current to the motor 4 based on the first PWM signal.

There will be described operation of a motor control device 210 when rotating the motor 4 in the case where the motor 4 is not locked.

The CPU 2 generates the first PWM signal with a duty ratio set for controlling the rotation of the motor 4, to be output to the motor control circuit 103. The first PWM signal is input to an AND circuit 117 via the PWM input terminal 14. The protection circuit 116 outputs a motor lock detection signal of a high level as an initial operation of the motor control circuit 103.

The AND circuit 117 outputs a fifth PWM signal of a high level in a case where both the first PWM signal from the CPU 2 and the motor lock detection signal from the protection circuit 116 are high, and outputs the fifth PWM signal of a low level in a case other than the above case. Therefore, in this case, the AND circuit 117 outputs the fifth PWM signal identical in waveform with the first PWM signal to the PWM signal control circuit 115 in response to the first PWM signal and the motor lock detection signal of a high level. The PWM signal control circuit 115 generates a sixth PWM signal obtained by performing the waveform shaping process for the fifth PWM signal from the AND circuit 117, to be output to the Hall element control circuit 113 and to the rotation control circuit 111.

In the Hall element control circuit 113, the capacitor 32 is charged in response to the sixth PWM signal of a high level via the resistor 31. The Schmidt comparator 42 outputs a signal of a high level when the charging voltage of the capacitor 32 becomes greater than the voltage of the power supply 41. Therefore, the npn transistor 33 is turned on, the npn transistor 34 is turned off, and the npn transistor 35 is turned on. Thus, the Hall element source voltage ((source voltage Vcc)–(corrector-emitter voltage of npn transistor 35)) is applied to the power input of the Hall element 5 via the Hall element source voltage supply terminal 19.

As a result of this, the Hall element 5 becomes in an operable state, and generates and outputs the rotational position detection signals S1 and S2 indicating the detection of rotational position of the rotor of the motor 4 relative to the Hall element 5. The rotational position detection signals S1 and S2 are input to the rotation control circuit 111 and to the protection circuit 116 via the S1 input terminal 15 and S2 input terminal 16. Thus, the rotation control circuit 111 rotates the motor 4 in a predetermined direction in the number of rotation corresponding to the sixth PWM signal, based on the sixth PWM signal and the rotational position detection signals S1 and S2.

The protection circuit 116 performs a following operation while the rotation control circuit 111 and the drive circuit 112 rotate the motor 4.

A Hall amplifier 231 differentially amplifies the rotational position detection signal S1 to be input to a positive input terminal thereof and the rotational position detection signal S2 to be input to a negative input terminal thereof, to output a Hall amplifier signal Hout to an FG signal output circuit 232. Based on the Hall amplifier signal Hout indicating a detection period of the rotational position of the rotor of the motor 4, the FG signal output circuit 232 generates an FG signal having a frequency corresponding to an actual rotational speed of the motor 4, to be output to a reset signal generating circuit 239.

A counter 237 counts, for example, falling edges of a reverse clock, and keeps outputting a signal of a low level until a count value reaches a value corresponding to a predetermined period longer than one period of the FG signal and outputs a signal of a high level when the count value reaches the predetermined value. The count value of the counter 237 is reset based on a RS signal of a low level from a NAND circuit 235. When the RS signal of a low level is output from the NAND circuit 235, a Q terminal of a D-FF circuit 233 and a /Q terminal of a D-FF circuit 234 are high. That is, the count value of the counter 237 is reset without reaching the predetermined value where a signal of high level is output, while the motor keeps rotating without being locked and the FG signal fluctuates periodically. Therefore, in this case, the counter 237 keeps outputting a signal of a low level.

An inverter 238 outputs a motor lock detection signal of a high level (i.e., level indicating that the motor is not locked) obtained by reversing a signal of a low level output from the counter 237, to the AND circuit 117. Thus, the AND circuit 117 outputs the fifth PWM signal identical in waveform with the first PWM signal, so that the motor 4 is rotated and the Hall element source voltage is applied to the power input of the Hall element 5.

There will then be described operation of the motor control device 210 when the motor 4 is locked.

When the motor 4 is locked, the rotational position of the rotor of the motor 4 relative to the Hall element 5 stops changing, so that the levels of the rotational position detection signals S1 and S2 are fixed, and therefore, the level is also fixed of the Hall amplifier signal Hout output from the Hall amplifier 231. Thus, the FG signal output from the FG signal output circuit 232 stops changing.

As a result of this, the counter 237 counts to obtain the predetermined value without being reset, thereby outputting a signal of a high level. The inverter 238 outputs a motor lock detection signal of a low level (i.e., level indicating that the motor is locked) obtained by reversing a signal of a high level output from the counter 237, to the AND circuit 117. Thus, the AND circuit 117 outputs the fifth PWM signal of a low level to the PWM signal control circuit 115 in response to the first PWM signal and the motor lock detection signal of a low level. The PWM signal control circuit 115 generates the sixth PWM signal obtained by performing the waveform shaping process for the fifth PWM signal of a low level, to be output to the Hall element control circuit 113 and to the rotation control circuit 111.

In the Hall element control circuit 113, the capacitor 32 is discharged in response to the sixth PWM signal of a low level via the resistor 31. The Schmidt comparator 42 outputs a signal of a low level when the charging voltage of the capacitor 32 is smaller than the voltage of the power supply 41. As a result, the npn transistor 33 is turned off, the npn transistor 34 is turned on, and the npn transistor 35 is turned off. Thus, application is stopped of the Hall element source voltage to the power input of the Hall element 5 via the Hall element source voltage supply terminal 19. Therefore, the Hall element 5 stops performing a detection operation, thereby ceasing to output the rotational position detection signals S1 and S2 to the rotation control circuit 111.

The rotation control circuit 111 outputs the base voltages A to D of low levels to the base electrodes of the source transistors 21 and 22 and the sink transistors 23 and 24, respectively, based on the sixth PWM signal of a low level. Therefore, the source transistors 21 and 22 and the sink transistors 23 and 24 are turned off, and thus current supply to the motor 4 is cased. When the motor 4 is released from a locked state, the motor lock detection signal of a high level based on the FG signal is input again to the AND circuit 117.

The above motor control circuits 100 and 103 are suitable to be used for controlling the rotation of a fan motor for cooling such a device to be cooled, e.g., a processor included in electronic device, such as a notebook personal computer. By using the above motor control circuits 100 and 103, power consumption of the entire electronic device can be reduced.

The above embodiments of the present invention are simply for facilitating the understanding of the present invention and are not in any way to be construed as limiting the present invention. The present invention may variously be changed or altered without departing from its spirit and encompass equivalents thereof.

According to embodiments of the invention as above, when a rotation control signal for controlling the rotation of the motor 4 (second PWM signal, Vin signal, ENABLE signal, sixth PWM signal, etc.) is not generated, application of the Hall element source voltage can be stopped. As a result, there is improved use efficiency of the source voltage for the Hall element 5, and furthermore, there can be reduced power consumption of the entire motor control device 200 including the motor 4, the Hall element 5.

An AC signal for determining the number of rotation of the motor 4 is integrated by an integrating circuit (including the resistor 31 and the capacitor 32), and when an output voltage from the integrating circuit is smaller than the voltage of the power supply 41, application can be stopped of the Hall element source voltage. Each of the second PWM signal and the sixth PWM signal is an example of such AC signal. In the motor control circuit 100 according to an embodiment of the present invention, there can also be improved the use efficiency of the source voltage for the Hall element 5 as in the case with such an AC signal.

When a DC signal for determining the number of rotation of the motor 4 (Vin1 signal, ENABLE signal of a high level, etc.) has a voltage smaller than the voltage of the power supply 41, application can be stopped of the Hall element source voltage. Therefore, in the motor control circuit 100 according to an embodiment of the present invention, there can also be improved the use efficiency of the source voltage for the Hall element 5 as in the case with the DC signal for determining the number of rotation of the motor 4.

When the count value of edges of the second PWM signal obtained by counting with the counter 160 reaches a predetermined value within a predetermined period, the Hall element source voltage can be applied to the power input of the Hall element 5. As a result, the Hall element 5 can be operated when the second PWM signal is reliably input to the Hall element control circuit 113, and thus, there can be further improved use the efficiency the source voltage for the Hall element 5.

By using the motor lock detection signal output from the protection circuit 116, application can be stopped of the Hall element source voltage, in a case where the motor 4 is not rotating, i.e., the motor 4 is locked, though the first PWM signal is generated. As a result of this, there can further be improved the use efficiency of the source voltage for the Hall element 5.

What is claimed is:

1. A motor control circuit comprising:
   a rotation control circuit configured to control rotation of a motor based on a rotation control signal for controlling rotation of the motor and a rotational position detection signal from a Hall element for detecting a rotational position of the motor;
   a determining circuit configured to determine whether the rotation control signal has been generated for a predetermined time period; and
   a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

2. A motor control circuit comprising:
   a rotation control circuit configured to control rotation of a motor based on a rotation control signal for controlling rotation of the motor and a rotational position detection signal from a Hall element for detecting a rotational position of the motor;
   a switching element interposed between a power supply for generating a voltage corresponding to a Hall element source voltage and a power input of the Hall element;
   a determining circuit configured to determine whether the rotation control signal has been generated for a predetermined time period; and
   a Hall element control circuit configured to apply the Hall element source voltage to the Hall element by turning on the switching element when the determining circuit determines that the rotation control signal has been generated for the predetermined time period, and to stop applying the Hall element source voltage to the Hall element by turning off the switching element when the determining circuit determines that the rotation control signal has not necessarily been generated for the predetermined time period.

3. A fan motor comprising:
   a fan;
   a motor configured to drive the fan; and
   a motor control circuit configured to control rotation of the motor,
   the motor control circuit including:
   a rotation control circuit configured to control rotation of the motor based on a rotation control signal for controlling rotation of the motor and a rotational position detection signal from a Hall element for detecting a rotational position of the motor;
   a determining circuit configured to determine whether the rotation control signal has been generated for a predetermined time period; and
   a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

4. A fan motor comprising:
   a fan;
   a motor configured to drive the fan; and
   a motor control circuit configured to control rotation of the motor,
   the motor control circuit including:
   a rotation control circuit configured to control rotation of the motor based on a rotation control signal for controlling rotation of the motor and a rotational position detection signal from a Hall element for detecting a rotational position of the motor;

a switching element interposed between a power supply for generating a voltage corresponding to a Hall element source voltage and a power input of the Hall element;

a determining circuit configured to determine whether the rotation control signal has been generated for a predetermined time period; and a Hall element control circuit configured to apply the Hall element source voltage to the Hall element by turning on the switching element when the determining circuit determines that the rotation control signal has been generated for the predetermined time period, and to stop applying the Hall element source voltage to the Hall element by turning off the switching element when the determining circuit determines that the rotation control signal has not necessarily been generated for the predetermined time period.

5. Electronic device comprising:

a fan;

a motor configured to drive the fan;

a motor control circuit configured to control rotation of the motor; and a cooled device to be cooled by the fan, the motor control circuit including:

a rotation control circuit configured to control rotation of the motor based on a rotation control signal for controlling rotation of the motor and a rotational position detection signal from a Hall element for detecting a rotational position of the motor;

a determining circuit configured to determine whether the rotation control signal has been generated for a predetermined time period; and a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

6. Electronic device comprising:

a fan;

a motor configured to drive the fan;

a motor control circuit configured to control rotation of the motor; and a cooled device to be cooled by the fan, the motor control circuit including:

a rotation control circuit configured to control rotation of the motor based on a rotation control signal for controlling rotation of the motor and a rotational position detection signal from a Hall element for detecting a rotational position of the motor;

a switching element interposed between a power supply for generating a voltage corresponding to a Hall element source voltage and a power input of the Hall element;

a determining circuit configured to determine whether the rotation control signal has been generated for a predetermined time period; and a Hall element control circuit configured to apply the Hall element source voltage to the Hall element by turning on the switching element when the determining circuit determines that the rotation control signal has been generated for the predetermined time period, and to stop applying the Hall element source voltage to the Hall element by turning off the switching element when the determining circuit determines that the rotation control signal has not necessarily been generated for the predetermined time period.

7. A notebook personal computer comprising:

a fan;

a motor configured to drive the fan;

a motor control circuit configured to control rotation of the motor; and a processor configured to be cooled by the fan, the motor control circuit including:

a rotation control circuit configured to control rotation of the motor based on a rotation control signal for controlling rotation of the motor and a rotational position detection signal from a Hall element for detecting a rotational position of the motor;

a determining circuit configured to determine whether the rotation control signal is generated for a predetermined time period; and a Hall element control circuit configured to apply a Hall element source voltage to the Hall element when the determining circuit determines that the rotation control signal has been generated for the predetermined time period, and to stop applying the Hall element source voltage to the Hall element when the determining circuit determines that the rotation control signal has not necessarily been generated for the predetermined time period.

8. A notebook personal computer comprising:

a fan;

a motor configured to drive the fan;

a motor control circuit configured to control rotation of the motor; and a processor configured to be cooled by the fan, the motor control circuit including:

a rotation control circuit configured to control rotation of the motor based on a rotation control signal for controlling rotation of the motor and a rotational position detection signal from a Hall element for detecting a rotational position of the motor;

a switching element interposed between a power supply for generating a voltage corresponding to a Hall element source voltage and a power input of the Hall element;

a determining circuit configured to determine whether the rotation control signal has been generated for a predetermined time period; and a Hall element control circuit configured to apply the Hall element source voltage to the Hall element by turning on the switching element when the determining circuit determines that the rotation control signal has been generated for the predetermined time period, and to stop applying the Hall element source voltage to the Hall element by turning off the switching element when the determining circuit determines that the rotation control signal has not necessarily been generated for the predetermined time period.

* * * * *